(No Model.)

A. L. AVERY.
GAS AND AIR MIXER.

No. 536,945. Patented Apr. 2, 1895.

WITNESSES
Geo. E. Frech
James W. Birans

INVENTOR
A. L. Avery
per
Lehmann Pattison Nesbit
attys.

UNITED STATES PATENT OFFICE.

AMOS L. AVERY, OF BRADFORD, PENNSYLVANIA.

GAS AND AIR MIXER.

SPECIFICATION forming part of Letters Patent No. 536,945, dated April 2, 1895.

Application filed May 9, 1894. Serial No. 510,666. (No model.)

*To all whom it may concern:*

Be it known that I, AMOS L. AVERY, of Bradford, in the county of McKean and State of Pennsylvania, have invented certain new and useful Improvements in Gas and Air Mixers; and I do hereby declare the following to be a full, clear, and exact description of the invention, such as will enable others skilled in the art to which it pertains to make and use it, reference being had to the accompanying drawings, which form part of this specification.

My invention relates to improvements in gas and air mixers; and it has relation to certain improvements in the construction of my patent granted June 21, 1892, bearing No. 477,288.

The object of my invention is to provide the air tube above the gas chamber with an internal conical or tapering shape, which begins at the upper wall of the said gas chamber and extends upward and intersects or coincides with the internal vertical wall of the said air tube; and to furnish an air tube which passes through the said gas chamber, the lower portion of the same being screw threaded, and the upper portion being tapered inward toward its upper end to the outwardly extending peripheral flange, which is provided with a series of vertical perforations through which the gas passes from the gas chamber, the periphery of the said flange being tapered so that as the tube is screwed into position the said flange seats itself tightly against the tapering wall of the upper air tube and makes a tight joint; the construction serving to prevent any possible change in the size of the gas openings as is the case in my said patent, so that a perfect working of the mixer at all times is insured.

Figure 1:
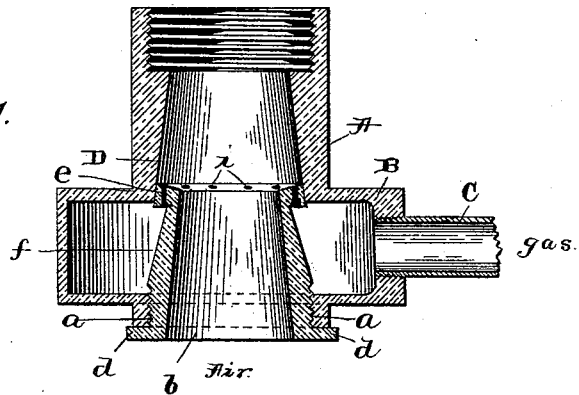
Figure 2:
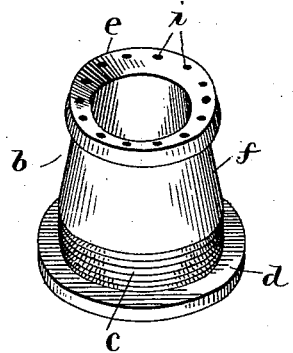

In the accompanying drawings:—Figure 1 is a longitudinal vertical sectional view of a mixer which embodies my invention. Fig. 2 is a detached perspective view of the lower air tube.

A indicates an upper air tube, which is connected at its lower end to an enlarged horizontal gas chamber B, having in its side wall an opening for the passage of an inlet gas pipe C. The lower end of this air tube A just above the ceiling of the gas chamber, is tapered as shown at D, from its lower end upward and intersecting its inner vertical wall, the object of which will appear farther on.

The lower wall of the gas chamber is provided with a central screw threaded opening $a$, for the reception of a lower air tube $b$. This lower air tube $b$, is provided at its lower portion with a screw thread $c$, fitting the opening $a$, and below this preferably with a flange $d$. This tube $b$, is provided at its upper end with a peripheral flange $e$, which has its periphery tapered to fit the tapered portion of the upper tube A, tightly and form a gas tight joint as the said tube $b$ is being screwed into position. Below this flange $e$, and between it and the screw threaded portion, the tube $b$ is provided with the inwardly tapered portion $f$, extending upward under the flange $e$, thus forming the said flange $e$. This flange is provided with a series of perforations $i$, through which the gas passes into the upper air tube A, where it is mixed with the air passing through the tube $b$. Owing to this construction, the gas inlet remains always the same, so that the amount of gas and air for a proper combustion is always insured, and this lower tube is to be permanently fixed by a metal or other packing so that it cannot be tampered with. However, even if this lower tube is made readily removable for the purpose of affording access to clean it, when it is screwed back to place, a tight joint is formed by the flange $e$, and the taper in the tube A, and the gas inlets remain the same for feeding the proper amount of gas. This construction is very desirable for the invention is used in connection with boilers, heating and cooking stoves where they are liable to be tampered with, and it is necessary that a construction should be such that the size of the openings cannot be varied by a person tampering therewith. The taper in the tube A extends above the upper face of the flange $e$, as clearly shown in Fig. 1, so that a free passage of the gas through the perforations in the said flange into the tube A is permitted.

Having thus described my invention, what I claim, and desire to secure by Letters Patent, is—

A gas and air mixer comprising an upper air tube, an enlarged gas chamber at the lower end thereof, the lower end of the said air tube being tapered inwardly from its lower end, the lower wall of the gas chamber having an opening concentric with the said upper air tube, and a gas inlet, and a lower air tube passing through said concentric opening having a peripheral flange at its upper end adapted to fit the said tapered portion of the upper air tube, vertical perforations through the said flange, and a reduced portion below the said flange, all combined as and for the purpose shown and described.

In testimony whereof I affix my signature in presence of two witnesses.

AMOS L. AVERY.

Witnesses:
B. J. MacEwen,
J. Bedell.